(12) United States Patent
Uehara et al.

(10) Patent No.: US 9,599,186 B2
(45) Date of Patent: Mar. 21, 2017

(54) DAMPER DEVICE

(71) Applicant: EXEDY Corporation, Neyagawa-shi, Osaka (JP)

(72) Inventors: Hiroshi Uehara, Neyagawa (JP); Yoshinari Yoshimura, Neyagawa (JP); Takeshi Senoue, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 14/621,959

(22) Filed: Feb. 13, 2015

(65) Prior Publication Data

US 2015/0240909 A1 Aug. 27, 2015

(30) Foreign Application Priority Data

Feb. 27, 2014 (JP) ................................. 2014-037396

(51) Int. Cl.
*F16F 15/123* (2006.01)
*F16F 15/134* (2006.01)
*F16F 15/121* (2006.01)

(52) U.S. Cl.
CPC .... *F16F 15/12373* (2013.01); *F16F 15/1217* (2013.01); *F16F 15/12333* (2013.01); *F16F 15/13446* (2013.01)

(58) Field of Classification Search
CPC .......... F16F 15/12366; F16F 15/12373; F16F 15/1245; F16F 15/1338; F16F 15/1343; F16F 15/13446; F16F 15/13484; F16F 15/13492; F16F 15/30; F16F 15/12333; F16F 15/137

USPC ............................................. 464/68.9–68.92
See application file for complete search history.

(56) References Cited

U.S. PATENT DOCUMENTS

| 4,650,053 A | * | 3/1987 | Kayanoki ........... F16F 15/1238 464/68.4 |
| 4,789,374 A | * | 12/1988 | Suzuki ....................... 464/68.92 |
| 5,307,710 A | * | 5/1994 | Feldhaus et al. .......... 464/68.92 |
| 7,445,553 B2 | * | 11/2008 | Nakagaito et al. ........ 464/68.91 |
| 2012/0252588 A1 | * | 10/2012 | Saeki et al. ................ 464/68.91 |

FOREIGN PATENT DOCUMENTS

JP 2012-159111 A 8/2012

* cited by examiner

*Primary Examiner* — Josh Skroupa
(74) *Attorney, Agent, or Firm* — Global IP Counselors, LLP

(57) ABSTRACT

A flywheel assembly includes a first rotary member, a second rotary member, a first coil spring, a second coil spring, an intermediate plate, a first stopper mechanism and a first contact relief member. The first coil spring is configured to be compressed between the first rotary member and the second rotary member. The second coil spring is configured to be compressed between the first rotary member and the second rotary member and has a stiffness greater than a stiffness of the first coil spring. The intermediate member is engaged with the first coil spring and the second coil spring and couples the first coil spring and the second coil spring in series. The first stopper mechanism is configured to deactivate the first coil spring. The first contact relief member is movably disposed inside the first coil spring and is capable of relieving the contact in the first stopper mechanism during activation of the first coil spring.

9 Claims, 3 Drawing Sheets

DAMPER DEVICE

CROSS-REFERENCE TO RELATED APPLICATIONS

This application claims priority under 35 U.S.C. §119(a) to Japanese Patent Application No. JP2014-37396 filed on Feb. 27, 2014, the entirety of which is hereby incorporated by reference.

BACKGROUND

Field of Invention

The present invention relates to a damper device.

Background Information

Various devices are installed in a drivetrain of a vehicle to transmit power generated in an engine to a transmission. A damper device and a flywheel assembly can be exemplified as these types of devices. Damper devices are used for these devices to attenuate rotary vibrations (see Japan Laid-open Patent Application Publication No. JP-A-2012-159111).

The aforementioned damper device mainly includes an input-side rotary member (a first side plate and a second side plate), an output-side rotary member (a center plate), a plurality of coil springs to be compressed between the first side plate and the center plate, and an intermediate plate for coupling the coil springs.

When multistage torsional characteristics are set for this type of damper device, one or more bent points of the torsional characteristics, the upper limit of a torsion angle and so forth, are often set by causing coiled parts of intended ones of the plural coil springs to be closely contacted to each other. In this case, however, the coil springs can be damaged or broken by repeatedly causing the coiled parts of the coil springs to be closely contacted to each other.

On the other hand, to solve the aforementioned drawback, there has been developed a technology for mechanically deactivating the coil springs with use of the input-side rotary member and the output-side rotary member. In a stopper mechanism as an example of this technology, the coil springs are configured to be deactivated by causing the input-side rotary member and the output-side rotary member to contact each other. In this case, however, collision sounds are produced when the input-side rotary member and the output-side rotary member are contacted.

For example, the aforementioned stopper mechanism is configured to be activated when large torque is abruptly inputted into the input-side rotary member under a condition that a small torsion angle is produced (small torque is produced) between the input-side rotary member and the output-side rotary member. Accordingly, collision sounds are produced as described above. Hence, it is expected to establish a technology for lessening the collision sounds.

SUMMARY

It is an object of the present invention to lessen activation sounds of a damper device.

A damper device according to a first exemplary embodiment of the present invention includes a first rotary member, a second rotary member, a first coil spring, a second coil spring, an intermediate member, a first stopper mechanism and a first contact relief member. The first rotary member is a member into which a power of an engine is inputted. The second rotary member is disposed to be rotatable with respect to the first rotary member. The first coil spring is configured to be compressed between the first rotary member and the second rotary member. The second coil spring is configured to be compressed between the first rotary member and the second rotary member. The second coil spring has a stiffness greater than a stiffness of the first coil spring.

The intermediate member is configured to engage the first coil spring and the second coil spring. The intermediate member also is configured to couple the first coil spring and the second coil spring in series. The first stopper mechanism is configured to deactivate the first coil spring by causing the intermediate member and one of the first rotary member and the second rotary member to contact each other. The first contact relief member is movably disposed inside the first coil spring. The first contact relief member is configured to relieve the contact in the first stopper mechanism during activation of the first coil spring.

In the present damper device, when inputted into the first rotary member, the power of the engine is sequentially transmitted to the first rotary member, the intermediate member and the second rotary member in this order. In the power transmission path, the first coil spring and the second coil spring are compressed between the first rotary member and the second rotary member through the intermediate member.

In the present damper device, the first coil spring and the second coil spring are coupled in series, and the stiffness of the first coil spring is less than that of the second coil spring. Thus, the first coil spring is more compressed than the second coil spring. Due to this, when large torque is abruptly inputted into the first rotary member, two members (i.e., the intermediate member and one of the first rotary member and the second rotary member), which compress the first coil spring, can contact each other. In other words, the first stopper mechanism can be activated.

However, in the present damper device, the first contact relief member is disposed inside the first coil spring. Hence, the first contact relief member hinders the first stopper mechanism from being activated. Further, even when the first stopper mechanism is activated, the first contact relief member can lessen activation sounds of the first stopper mechanism. In other words, the present damper device can lessen activation sounds to be produced in device activation.

A damper device according to a second exemplary embodiment of the present invention relates to the damper device of the first exemplary embodiment, and wherein the first contact relief member is an elastic member. Further, the first contact relief member is configured to compress between the intermediate member and the one of the first rotary member and the second rotary member, when a rotary angle of the second rotary member relative to the first rotary member is less than a rotary angle at which the first stopper mechanism is activated.

In the present damper device, the first contact relief member is configured to be compressed between the intermediate member and the one of the first rotary member and the second rotary member when the rotary angle of the second rotary member relative to the first rotary member is less than the aforementioned rotary angle. Thus, the first contact relief member is configured to be compressed before activation of the first stopper mechanism. Hence, the present damper device can lessen activation sounds to be produced in device activation. It should be noted that strictly speaking, "the rotary angle" is interpreted as "an absolute value of the rotary angle" because "the rotary angle" is a real number.

A damper device according to a third exemplary embodiment of the present invention relates to the damper device of the second exemplary embodiment, and wherein the first contact relief member is an elastic member made of resin.

In the present damper device, the first contact relief member is made of resin. Thus, the first contact relief member itself does not produce activation sounds when being compressed. Hence, the present damper device can reliably lessen activation sounds produced in device activation.

A damper device according to a fourth exemplary embodiment of the present invention relates to the damper device of the first to third exemplary embodiments, and further includes a second stopper mechanism and a second contact relief member. The second stopper mechanism is configured to deactivate the second coil spring by causing the intermediate member and the other of the first rotary member and the second rotary member to contact each other. The second contact relief member is movably disposed inside the second coil spring and is configured to relieve the contact in the second stopper mechanism during activation of the second coil spring.

In the present damper device, when large torque is abruptly inputted into the first rotary member, two members (i.e., the intermediate member and the other of the first rotary member and the second rotary member), which compress the second coil spring, can contact each other. In other words, the second stopper mechanism can be activated.

However, in the present damper device, the second contact relief member is disposed inside the second coil spring. Hence, the second contact relief member hinders the second stopper mechanism from being activated. Further, even when the second stopper mechanism is activated, the second contact relief member can lessen activation sounds of the second stopper mechanism. In other words, the present damper device can lessen activation sounds to be produced in device activation.

A damper device according to a fifth exemplary embodiment of the present invention relates to the damper device of the fourth exemplary embodiment, and wherein the second contact relief member is an elastic member. Further, the second contact relief member is configured to compress between the intermediate member and the other of the first rotary member and the second rotary member, when a rotary angle of the second rotary member relative to the first rotary member is less than a rotary angle at which the second stopper mechanism is activated.

In the present damper device, the second contact relief member is configured to be compressed between the intermediate member and the other of the first rotary member and the second rotary member when the rotary angle of the second rotary member relative to the first rotary member is less than the aforementioned rotary angle. Thus, the second contact relief member is configured to be compressed before activation of the second stopper mechanism. Hence, the present damper device can lessen activation sounds to be produced in device activation.

A damper device according to a sixth exemplary embodiment of the present invention relates to the damper device of the fifth exemplary embodiment, and wherein the second contact relief member is an elastic member made of resin.

In the present damper device, the second contact relief member is made of resin. Thus, the second contact relief member itself does not produce activation sounds when being compressed. Hence, the present damper device can reliably lessen activation sounds produced in device activation.

Overall, according to exemplary embodiments of the present invention, activation sounds of the damper mechanism can be lessened.

BRIEF DESCRIPTION OF THE DRAWINGS

Referring now to the attached drawings which form a part of this original disclosure.

DETAILED DESCRIPTION OF EXEMPLARY EMBODIMENTS

Entire Construction

Figure 1:
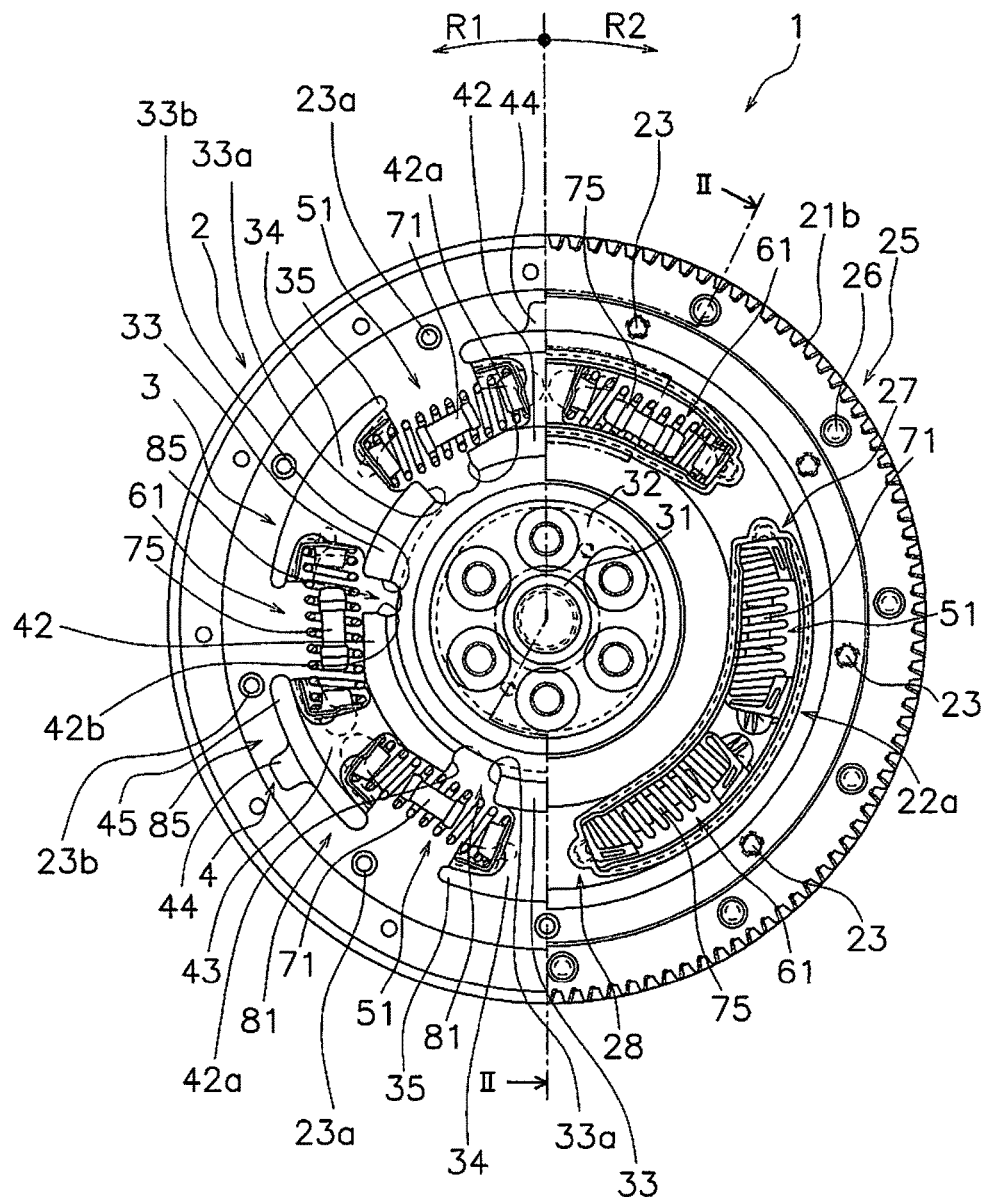
FIG. 1 is a side view of a flywheel assembly according to an exemplary embodiment of the present invention.

A flywheel assembly 1 (an exemplary damper device) will be hereinafter explained with reference to FIGS. 1 and 2. The flywheel assembly 1 is a device for transmitting power generated by an engine to a transmission.

The flywheel assembly 1 includes an input plate 2 (an exemplary first rotary member), an output plate 3 (an exemplary second rotary member), low stiffness springs 51 (exemplary first coil springs), high stiffness springs 61 (exemplary second coil springs), a support plate 4 (an exemplary intermediate member), a first stopper mechanism 81, a second stopper mechanism 85, first shock absorber members 71 (exemplary first contact relief members) and second shock absorber members 75 (exemplary second contact relief members). The input plate 2, the support plate 4 and the output plate 3 are disposed on the inner peripheral side in this sequential order in an axial direction from an engine side to a transmission side.

Input Plate

Power of the engine is inputted into the input plate 2. Put differently, the input plate 2 is a member into which power generated by the engine is inputted. The input plate 2 is disposed on the engine side. The input plate 2 is fixed to a crankshaft (not shown in the drawings) of the engine.

The input plate 2 includes a first plate 21, a second plate 22 and coupling members 23. The first plate 21 is disposed on the engine side. The first plate 21 has coupling parts 21a in the inner peripheral part thereof to couple the first plate 21 to the engine.

A reinforcement member 24 is mounted to the coupling parts 21a to reinforce the coupling parts 21a. For example, the coupling parts 21a are apertures, whereas the reinforcement member 24 is a spacer. Fixture members, such as fixture bolts (not shown in the drawings) or rivets, are inserted through the apertures 21a. When described in detail, the fixture bolts or rivets are inserted through the apertures 21a, while the spacer 24 is disposed between the apertures 21a and the head parts of the fixture bolts or rivets. The first plate 21 is thus fixed to the crankshaft of the engine.

A pair of ring members 25 is fixed to the outer peripheral part of the first plate 21 by fixture members, such as rivets 26. One of the ring members 25 has a serrated part 21b formed on the outer peripheral part thereof to initiate an action of the input plate 2 (the first plate 21). It should be noted that the serrated part 21b may be integrally formed on the outer peripheral part of the first plate 21.

Figure 2:
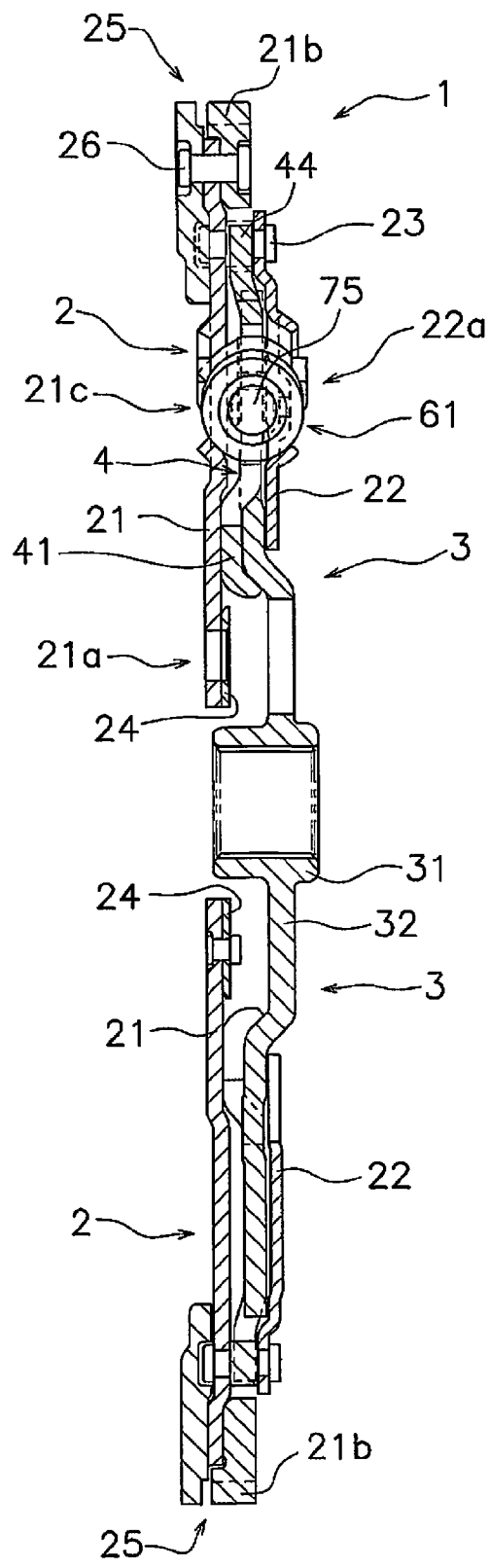
FIG. 2 is a cross-sectional view of FIG. 1 taken along a cutaway line II-II.

The first plate 21 has a plurality of window parts 21c (see FIG. 2). When described in detail, the plural (e.g., three) window parts 21c are bored in the first plate 21 to be circumferentially aligned at predetermined intervals. Each window part 21c accommodates one low stiffness spring 51 and one high stiffness spring 61. One end of the low stiffness spring 51 contacts one circumferential end of each window part 21c through one spring sheet. On the other hand, one end of the high stiffness spring 61 contacts the other circumferential end of each window part 21c through another spring sheet.

The second plate 22 is disposed on the transmission side to be opposed to the first plate 21. When described in detail, the second plate 22 is disposed axially away from the first plate 21 at a predetermined interval. The outer peripheral part of the second plate 22 is fixed to the first plate 21 by the coupling members 23. Thus, the second plate 22 is unitarily rotatable with the first plate 21.

The second plate 22 has a plurality of window parts 22a. When described in detail, the plurality (e.g., three) of window parts 22a are bored in the second plate 22 to be circumferentially aligned at predetermined intervals. The plurality of window parts 22a of the second plate 22 are respectively disposed to be axially opposed to the window parts 21c of the first plate 21. Each window part 22a accommodates one low stiffness spring 51 and one high stiffness spring 61. The one end of the low stiffness spring 51 contacts one circumferential end of each window part 22a through the aforementioned one spring sheet. On the other hand, the one end of the high stiffness spring 61 contacts the other circumferential end of each window part 22a through the aforementioned another spring sheet.

The coupling members 23 serve to couple the first plate 21 and the second plate 22. Specifically, the coupling members 23 (e.g., rivets) couple the first plate 21 and the second plate 22 in a condition that the first plate 21 and the second plate 22 are disposed axially away from each other at a predetermined interval.

Further, some of the coupling members 23 are contactable to the support plate 4 between the first plate 21 and the second plate 22. This contact restricts rotation of the support plate 4. Specifically, those coupling members 23 contactable to the support plate 4 are disposed on both sides of the support plate 4 (respective rotation restriction parts 44 to be described) in the circumferential direction. It should be noted that in FIGS. 1 and 2, a reference sign 23 is only assigned to those coupling members 23 contactable to the support plate 4.

As described above, the one end of each low stiffness spring 51 contacts the one end of each pair of opposed window parts 21c and 22a of the first and second plates 21 and 22 through the aforementioned one spring sheet. On the other hand, the one end of each high stiffness spring 61 contacts the other end of each pair of opposed window parts 21c and 22a of the first and second plates 21 and 22 through the aforementioned another spring sheet. In the following explanation, the one end of each pair of opposed window parts 21c and 22a to be contacted to each low stiffness spring 51 will be referred to as "a first pressing part 27", whereas the other end of each pair of opposed window parts 21c and 22a to be contacted to each high stiffness spring 61 will be referred to as "a second pressing part 28".

Output Plate

The output plate 3 outputs the power of the engine to the transmission. The output plate 3 is disposed to be rotatable with respect to the input plate 2. The output plate 3 is fixed to an output shaft (not shown in the drawings) coupled to the transmission.

The output plate 3 has a cylindrical part 31, an annular part 32, first contact parts 33 and third pressing parts 34. The cylindrical part 31 is fixed to the output shaft (not shown in the drawings) coupled to the transmission. The annular part 32 is integrally formed with the outer peripheral part of the cylindrical part 31. The first contact parts 33 are formed on the outer peripheral part of the annular part 32. The first contact parts 33 are contactable to the support plate 4 (second contact parts 42 to be described).

Each third pressing part 34 presses at least either of one low stiffness spring 51 and one high stiffness spring 61. Each third pressing part 34 extends radially outward from the annular part 32 and is integrally formed with the annular part 32. Further, a list extension part 35 is formed on the outer peripheral part of each third pressing part 34 to extend in the circumferential direction. The first extension part 35 is disposed on the outer peripheral side of the low stiffness spring 51 and the high stiffness spring 61. Specifically, the first extension part 35 is disposed on the outer peripheral side of one end of the low stiffness spring 51 through one spring sheet, while being disposed on the outer peripheral side of one end of the high stiffness spring 61 through another spring sheet. With the construction, the first extension part 35 restricts the low stiffness spring 51 and the high stiffness spring 61 from moving to the outer peripheral side.

Support Plate

The support plate 4 is engaged with the low stiffness springs 51 and the high stiffness springs 61. The support plate 4 couples each pair of the low stiffness spring 51 and the high stiffness spring 61 in series.

The support plate 4 has an annular body 41 (see FIG. 2), the second contact parts 42, engaging parts 43 and the rotation restriction parts 44. The body 41 is disposed on the inner peripheral side of the low stiffness springs 51 and the high stiffness springs 61. The second contact parts 42 are formed on the outer peripheral part of the body 41. The second contact parts 42 are contactable to the output plate 3. When described in detail, the second contact parts 42 are respectively disposed to be circumferentially opposed to the list contact parts 33 of the output plate 3. The second contact parts 42 are respectively contactable to the opposed first contact parts 33 of the output plate 3.

Each engaging part 43 is disposed between one low stiffness spring 51 and one high stiffness spring 61. Each engaging part 43 is engaged with one end of the low stiffness spring 51 and one end of the high stiffness spring 61. When described in detail, each engaging part 43 is engaged with one end of the low stiffness spring 51 through one spring sheet, while being engaged with one end of the high stiffness spring 61 through another spring sheet. The engaging parts 43 extend radially outward from the body 41 and are integrally formed with the body 41. The engaging parts 43 and the third pressing parts 34 of the output plate 3 are disposed to be alternately aligned in the circumferential direction.

Further, a second extension part 45 is formed on the outer peripheral part of each engaging part 43 to extend in the circumferential direction. The second extension part 45 is disposed on the outer peripheral side of the low stiffness spring 51 and the high stiffness spring 61. Specifically, the second extension part 45 is disposed on the outer peripheral side of the one end of the low stiffness spring 51 through the aforementioned one spring sheet, while being disposed on the outer peripheral side of the one end of the high stiffness spring 61 through the aforementioned another spring sheet. Thus, the second extension part 45 restricts the low stiffness spring 51 and the high stiffness spring 61 from moving to the outer peripheral side.

The rotation restriction parts 44 restrict rotation of the support plate 4. Each rotation restriction part 44 is formed on each engaging part 43. When described in detail, each rotation restriction part 44 protrudes radially outward from each engaging part 43 and is integrally formed with each engaging part 43. The rotation restriction parts 44 are contactable to some of the coupling members 23 of the input plate 2. The rotation restriction parts 44 restrict rotation of the support plate 4 by making contact with some of the coupling members 23 of the input plate 2.

Low Stiffness Springs

The low stiffness springs 51 are configured to be circumferentially compressed between the input plate 2 and the output plate 3. When described in detail, each low stiffness spring 51 is configured to be compressed between each first pressing part 27 of the first and second plates 21 and 22 and each third pressing part 34 of the output plate 3. When described in more detail, each low stiffness spring 51 is configured to be compressed between each first pressing part 27 of the first and second plates 21 and 22 and each engaging part 43 of the support plate 4. Each low stiffness spring 51 is also configured to be compressed between each third pressing part 34 of the output plate 3 and each engaging part 43 of the support plate 4.

In each pair of the springs 51 and 61, the low stiffness spring 51 is disposed in series with the high stiffness spring 61. When described in detail, the low stiffness spring 51 is disposed in series with the high stiffness spring 61 through the support plate 4. The stiffness of the low stiffness spring 51 is less than that of the high stiffness spring 61. When the low stiffness spring 51 and the high stiffness spring 61 are compressed, the amount of compression is larger in the low stiffness spring 51 than in the high stiffness spring 61, because the low stiffness spring 51 is herein disposed in series with the high stiffness spring 61, and further, the stiffness of the low stiffness spring 51 is less than that of the high stiffness spring 61.

High Stiffness Springs

The high stiffness springs 61 are configured to be circumferentially compressed between the input plate 2 and the output plate 3. When described in detail, each high stiffness spring 61 is configured to be compressed between each second pressing part 28 of the first and second plates 21 and 22 and each third pressing part 34 of the output plate 3. When described in detail, each high stiffness spring 61 is configured to be compressed between each second pressing part 28 of the first and second plates 21 and 22 and each engaging part 43 of the support plate 4. Each high stiffness spring 61 is also configured to be compressed between each third pressing part 34 of the output plate 3 and each engaging part 43 of the support plate 4.

In each pair of the springs 51 and 61, the high stiffness spring 61 is disposed in series with the low stiffness spring 51. When described in detail, the high stiffness spring 61 is disposed in series with the low stiffness spring 51 through the support plate 4. The stiffness of the high stiffness spring 61 is greater than that of the low stiffness spring 51. When the low stiffness spring 51 and the high stiffness spring 61 are compressed, the amount of compression is smaller in the high stiffness spring 61 than in the low stiffness spring 51, because the high stiffness spring 61 is herein disposed in series with the low stiffness spring 51, and further, the stiffness of the high stiffness spring 61 is greater than that of the low stiffness spring 51.

First Stopper Mechanism

The first stopper mechanism 81 is configured to deactivate the low stiffness springs 51 by causing the support plate 4 and one of the input plate 2 and the output plate 3 to contact each other.

In detail, when the input plate 2 is rotated in a first direction (an R1 direction in FIG. 1), the first stopper mechanism 81 is configured to deactivate the low stiffness springs 51 by causing the support plate 4 and the output plate 3 to contact each other. Contrarily, when the input plate 2 is rotated in a second direction (an R2 direction in FIG. 1), the first stopper mechanism 81 is configured to deactivate the low stiffness springs 51 by causing the support plate 4 and the input plate 2 to contact each other.

In the former condition, when described in more detail, the first stopper mechanism 81 is composed of the first contact parts 33 of the output plate 3 and the second contact parts 42 of the support plate 4. In the first stopper mechanism 81, when the input plate 2 is rotated in the first direction (the R1 direction in FIG. 1), the second contact part 42 (42a in FIG. 1) of the support plate 4, which is disposed on the inner peripheral side of each low stiffness spring 51, contacts its opposed first contact part 33 (33a in FIG. 1) of the output plate 3. Accordingly, each low stiffness spring 51 is configured to be deactivated.

On the other hand, in the latter condition, the first stopper mechanism 81 is composed of some of the coupling members 23 of the input plate 2 and the rotation restriction parts 44 of the support plate 4. In the first stopper mechanism 81, when the input plate 2 is rotated in the second direction (the R2 direction in FIG. 1), the coupling member 23 (23a in FIG. 1) of the input plate 2, which is disposed on the outer peripheral side of each low stiffness spring 51, contacts each rotation restriction part 44 of the support plate 4. Accordingly, each low stiffness spring 51 is configured to be deactivated.

Second Stopper Mechanism

The second stopper mechanism 85 is configured to deactivate the high stiffness springs 61 by causing the support plate 4 and the other of the input plate 2 and the output plate 3 to contact each other.

In detail, when the input plate 2 is rotated in the first direction (the R1 direction in FIG. 1), the second stopper mechanism 85 is configured to deactivate the high stiffness springs 61 by causing the support plate 4 and the input plate 2 to contact each other. Contrarily, when the input plate 2 is rotated in the second direction (the R2 direction in FIG. 1), the second stopper mechanism 85 is configured to deactivate the high stiffness springs 61 by causing the support plate 4 and the output plate 3 to contact each other.

In the former condition, when described in more detail, the second stopper mechanism 85 is composed of some of the coupling members 23 of the input plate 2 and the rotation restriction parts 44 of the support plate 4. In the second stopper mechanism 85, when the input plate 2 is rotated in the first direction (the R1 direction in FIG. 1), the coupling member 23 (23b in FIG. 1) of the input plate 2, which is disposed on the outer peripheral side of each high stiffness spring 61, contacts each rotation restriction part 44 of the support plate 4. Accordingly, each high stiffness spring 61 is configured to be deactivated.

On the other hand, in the latter condition, the second stopper mechanism 85 is composed of the first contact parts 33 of the output plate 3 and the second contact parts 42 of the support plate 4. In the second stopper mechanism 85, when the input plate 2 is rotated in the second direction (the R2 direction in FIG. 1), the second contact part 42 (42b in FIG. 1) of the support plate 4, which is disposed on the inner peripheral side of each high stiffness spring 61, contacts its opposed first contact part 33 (33b in FIG. 1) of the output plate 3. Accordingly, each high stiffness spring 61 is configured to be deactivated.

First Shock Absorber Members

The first shock absorber members 71 are capable of relieving activation of the first stopper mechanism 81 during activation of the low stiffness springs 51. The first shock absorber members 71 are elastic members. Specifically, the first shock absorber members 71 are elastic members made of resin. It should be noted that in the following explanation, the term "torsion angle" may be used as a meaning of "an absolute value of torsion angle".

Each first shock absorber member 71 is movably disposed inside each low stiffness spring 51. Each first shock absorber member 71 becomes compressible inside each low stiffness spring 51 when a torsion angle $\theta$ (an exemplary rotary angle) of the output plate 3 relative to the input plate 2 becomes a predetermined first angle $\theta 1$ (see FIG. 3) or greater. The predetermined first angle $\theta 1$ is less than a torsion angle $\theta 2$ (see FIG. 3) at which the first stopper mechanism 81 is activated.

In detail, the first shock absorber members 71 become compressible between the support plate 4 and one of the input plate 2 and the output plate 3 when the torsion angle $\theta$ of the output plate 3 relative to the input plate 2 is greater than or equal to the predetermined first angle $\theta 1$ and less than the torsion angle $\theta 2$ at which the first stopper mechanism 81 is activated. For example, each first shock absorber member 71 is compressible between each engaging part 43 of the support plate 4 and each first pressing part 27 of the first and second plates 21 and 22. Each first shock absorber member 71 is also compressible between each engaging part 43 of the support plate 4 and each third pressing part 34 of the output plate 3. It should be noted that the predetermined first angle $\theta 1$ is less than the torsion angle $\theta 2$ at which the first stopper mechanism 81 is activated.

In the aforementioned condition, even when large torque is abruptly inputted into the input plate 2, the first shock absorber members 71 hinder the first stopper mechanism 81 from being activated. Further, in activation of the first stopper mechanism 81, the first shock absorber members 71 also lessen activation sounds of the first stopper mechanism 81.

Second Shock Absorber Members

The second shock absorber members 75 are capable of relieving activation of the second stopper mechanism 85 during activation of the high stiffness springs 61. The second shock absorber members 75 are elastic members. Specifically, the second shock absorber members 75 are elastic members made of resin. It should be noted that in the following explanation, the term "torsion angle" may be used as a meaning of "an absolute value of torsion angle".

Each second shock absorber member 75 is movably disposed inside each high stiffness spring 61. Each second shock absorber member 75 becomes compressible inside each high stiffness spring 61 when the torsion angle $\theta$ of the output plate 3 relative to the input plate 2 becomes a predetermined second angle $\theta 3$ (see FIG. 3) or greater. The predetermined second angle $\theta 3$ is less than a torsion angle $\theta 4$ at which the second stopper mechanism 85 is activated.

In detail, the second shock absorber members 75 become compressible between the support plate 4 and one of the input plate 2 and the output plate 3 when the torsion angle $\theta$ of the output plate 3 relative to the input plate 2 is greater than or equal to the predetermined second angle $\theta 3$ and less than the torsion angle $\theta 4$ at which the second stopper mechanism 85 is activated. For example, each second shock absorber member 75 is compressible between each engaging part 43 of the support plate 4 and each second pressing part 28 of the first and second plates 21 and 22. Each second shock absorber member 75 is also compressible between each engaging part 43 of the support plate 4 and each third pressing part 34 of the output plate 3. It should be noted that the predetermined second angle $\theta 3$ is less than the torsion angle $\theta 4$ at which the second stopper mechanism 85 is activated.

In the aforementioned condition, even when large torque is abruptly inputted into the input plate 2, the second shock absorber members 75 hinder the second stopper mechanism 85 from being activated. Further, in activation of the second stopper mechanism 85, the second shock absorber members 75 also lessen activation sounds of the second stopper mechanism 85.

Actions of Flywheel Assembly

Figure 3:
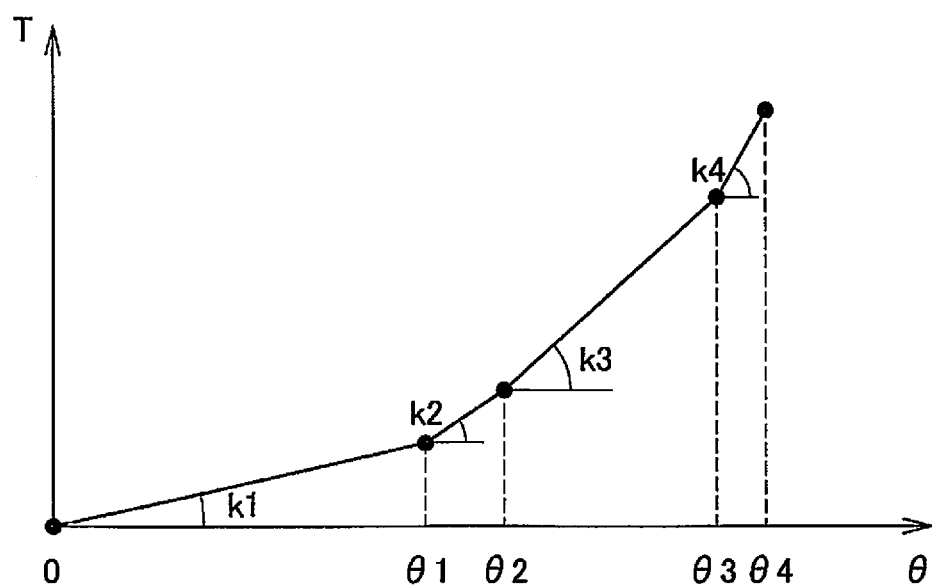
FIG. 3 is a diagram representing torsional characteristics of the flywheel assembly.

Actions (torsional characteristics) of the flywheel assembly 1 will be explained with reference to FIG. 3. In FIG. 3, the horizontal axis indicates the torsion angle $\theta$, whereas the vertical axis indicates torque. It should be noted that the flywheel assembly 1 according to the present exemplary embodiment includes three groups of springs, i.e., three pairs of the low stiffness spring 51 and the high stiffness spring 61 that are disposed in series. Each group of springs is thus composed of the low stiffness spring 51 and the high stiffness spring 61. In the following explanation, an arbitrary pair of the springs 51 and 61 will be focused for easy understanding.

Positive-Side Torsional Characteristics

First, power of the engine is inputted into the flywheel assembly 1, and in turn, the input plate 2 begins to be rotated with respect to the output plate 3 in the first direction (the R1 direction in FIG. 1). Accordingly, the low stiffness spring 51 and the high stiffness spring 61 begin to be compressed between the input plate 2 and the output plate 3.

Then, the high stiffness spring 61 and the low stiffness spring 51 are compressed between the input plate 2 and the output plate 3 through the support plate 4. When described in detail, the high stiffness spring 61 is compressed between the relevant second pressing part 28 of the input plate 2 and the relevant engaging part 43 of the support plate 4 through the spring sheets. On the other hand, the low stiffness spring 51 is compressed between the engaging part 43 of the support plate 4 and the relevant third pressing part 34 of the output plate 3 through the spring sheets. Accordingly, a first stage torsional stiffness K1 is formed as shown in FIG. 3.

Subsequently, when the torsion angle $\theta$ increases, the first shock absorber member 71 disposed inside the low stiffness spring 51 becomes contactable to the spring sheets. At this time, the torsion angle $\theta$ is $\theta 1$. The first shock absorber member 71 herein becomes compressible between the engaging part 43 of the support plate 4 and the third pressing part 34 of the output plate 3 through the spring sheets. In other words, the low stiffness spring 51 and the first shock absorber member 71 are herein compressed. Accordingly, a second stage torsional stiffness K2 is formed as shown in FIG. 3.

When the torsion angle $\theta$ further increases and reaches $\theta 2$ under the condition, the first stopper mechanism 81 is activated. When described in detail, on the inner peripheral side of the low stiffness spring 51, the relevant second contact part 42 of the support plate 4 contacts the relevant first contact part 33 of the output plate 3. Accordingly, the low stiffness spring 51 is deactivated.

Next, when the torsion angle $\theta$ further increases, only the high stiffness spring 61 is compressed between the input plate 2 and the output plate 3. When described in detail, the high stiffness spring 61 is compressed between the second pressing part 28 of the input plate 2 and the engaging part 43 of the support plate 4 through the spring sheets. Accordingly, a third stage torsional stiffness K3 is formed as shown in FIG. 3.

Subsequently, when the torsion angle θ increases, the second shock absorber member 75 disposed inside the high stiffness spring 61 becomes contactable to the spring sheets. At this time, the torsion angle θ is θ3. The second shock absorber member 75 herein becomes compressible between the second pressing part 28 of the input plate 2 and the engaging part 43 of the support plate 4 through the spring sheets. In other words, the high stiffness spring 61 and the second shock absorber member 75 are herein compressed. Accordingly, a fourth stage torsional stiffness K4 is formed as shown in FIG. 3.

When the torsion angle θ further increases under the condition, the second stopper mechanism 85 is activated. When described in detail, the coupling member 23 of the input plate 2, which is disposed on the outer peripheral side of the high stiffness spring 61, contacts the relevant rotation restriction part 44 of the support plate 4. Accordingly, the high stiffness spring 61 is deactivated. This is a condition that the torsion angle θ has reached the maximum torsion angle θ4.

Negative-Side Torsional Characteristics

Negative-side torsional characteristics are substantially the same as the positive-side torsional characteristics, and therefore, will be explained with reference to FIG. 3. Specifically, where the torsion angle θ is set as an absolute value in FIG. 3, FIG. 3 can be considered as a diagram for representing the negative-side torsional characteristics.

First, power of the engine is inputted into the flywheel assembly 1, and in turn, the input plate 2 begins to be rotated with respect to the output plate 3 in the second direction (the R2 direction in FIG. 1). Accordingly, the low stiffness spring 51 and the high stiffness spring 61 begin to be compressed between the input plate 2 and the output plate 3.

Then, the high stiffness spring 61 and the low stiffness spring 51 are compressed between the input plate 2 and the output plate 3 through the support plate 4. When described in detail, the low stiffness spring 51 is compressed between the relevant first pressing part 27 of the input plate 2 and the relevant engaging part 43 of the support plate 4 through the spring sheets. On the other hand, the high stiffness spring 61 is compressed between the engaging part 43 of the support plate 4 and the relevant third pressing part 34 of the output plate 3 through the spring sheets. Accordingly, the first stage torsional stiffness K1 is formed as shown in FIG. 3.

Subsequently, when the torsion angle θ increases, the first shock absorber member 71 disposed inside the low stiffness spring 51 becomes contactable to the spring sheets. At this time, the torsion angle θ is θ1. The first shock absorber member 71 herein becomes compressible between the engaging part 43 of the support plate 4 and the first pressing part 27 of the input plate 2 through the spring sheets. In other words, the low stiffness spring 51 and the first shock absorber member 71 are herein compressed. Accordingly, the second stage torsional stiffness K2 is formed as shown in FIG. 3.

When the torsion angle θ further increases and reaches θ2 under the condition, the first stopper mechanism 81 is activated. When described in detail, the coupling member 23 of the input plate 2, which is disposed on the outer peripheral side of the low stiffness spring 51, contacts the relevant rotation restriction part 44 of the support plate 4. Accordingly, the low stiffness spring 51 is deactivated.

Next, when the torsion angle θ further increases, only the high stiffness spring 61 is compressed between the input plate 2 and the output plate 3. When described in detail, the high stiffness spring 61 is compressed between the third pressing part 34 of the output plate 3 and the engaging part 43 of the support plate 4 through the spring sheets. Accordingly, the third stage torsional stiffness K3 is formed as shown in FIG. 3.

Subsequently, when the torsion angle θ increases, the second shock absorber member 75 disposed inside the high stiffness spring 61 becomes contactable to the spring sheets. At this time, the torsion angle θ is θ3. The second shock absorber member 75 herein becomes compressible between the engaging part 43 of the support plate 4 and the third pressing part 34 of the output plate 3 through the spring sheets. In other words, the high stiffness spring 61 and the second shock absorber member 75 are herein compressed. Accordingly, the fourth stage torsional stiffness K4 is formed as shown in FIG. 3.

When the torsion angle θ further increases under the condition, the second stopper mechanism 85 is activated. When described in detail, on the inner peripheral side of the high stiffness spring 61, the relevant second contact part 42 of the support plate 4 contacts the relevant first contact part 33 of the output plate 3. Accordingly, the high stiffness spring 61 is deactivated. This is a condition that the torsion angle θ has reached the maximum torsion angle θ4.

Features

The present exemplary embodiment of the damper device includes the input plate 2, the output plate 3, the low stiffness springs 51, the high stiffness springs 61, the support plate 4, the first stopper mechanism 81 and the first shock absorber members 71. The input plate 2 is a member into which power of the engine is inputted. The output plate 3 is disposed to be rotatable with respect to the input plate 2. The low stiffness springs 51 are configured to be compressed between the input plate 2 and the output plate 3. The high stiffness springs 61 are configured to be compressed between the input plate 2 and the output plate 3, and each high stiffness spring 61 has stiffness higher than that of each low stiffness spring 51.

The support plate 4 is engaged with the low stiffness springs 51 and the high stiffness springs 61. The support plate 4 also couples each pair of the low stiffness spring 51 and the high stiffness spring 61 in series. The first stopper mechanism 81 is configured to deactivate the low stiffness springs 51 by causing the support plate 4 and one of the input plate 2 and the output plate 3 to contact each other. Each first shock absorber member 71 is movably disposed inside each low stiffness spring 51 and is capable of relieving the contact in the first stopper mechanism 81 during activation of each low stiffness spring 51.

In the present exemplary embodiment of the damper device, when inputted into the input plate 2, the power of the engine is sequentially transmitted to the input plate 2, the support plate 4 and the output plate 3 in this order. In the power transmission path, the low stiffness springs 51 and the high stiffness springs 61 are compressed between the input plate 2 and the output plate 3 through the support plate 4.

In the present exemplary embodiment of the damper device, each pair of the low stiffness spring 51 and the high stiffness spring 61 is coupled in series, and the stiffness of each low stiffness spring 51 is less than that of each high stiffness spring 61. Thus, each low stiffness spring 51 is more compressed than each high stiffness spring 61. Due to this, when large torque is abruptly inputted into the input plate 2, two members (i.e., the support plate 4 and one of the input plate 2 and the output plate 3), which compress the low stiffness springs 51, can contact each other. In other words, the first stopper mechanism 81 can be activated.

However, in the present damper device, each first shock absorber member 71 is disposed inside each low stiffness spring 51. Hence, the first shock absorber members 71 hinder the first stopper mechanism 81 from being activated. Further, even when the first stopper mechanism 81 is activated, the first shock absorber members 71 can lessen activation sounds of the first stopper mechanism 81. In other words, the present exemplary embodiment of the damper device can lessen activation sounds produced in device activation.

In the present exemplary embodiment of the damper device, the first shock absorber members 71 are elastic members. Further, the first shock absorber members 71 are compressible between the support plate 4 and the one of the input plate 2 and the output plate 3 when the torsion angle θ of the output plate 3 relative to the input plate 2 is less than the torsion angle θ2 at which the first stopper mechanism 81 is activated.

In the present damper device, the first shock absorber members 71 are configured to be compressed between the support plate 4 and the one of the input plate 2 and the output plate 3 when the torsion angle θ of the output plate 3 relative to the input plate 2 is less than the aforementioned torsion angle θ2. Thus, the first shock absorber members 71 are configured to be compressed before activation of the first stopper mechanism 81. Hence, the present exemplary embodiment of the damper device can lessen activation sounds produced in device activation.

In the present damper device, the first shock absorber members 71 are elastic members made of resin.

In the present exemplary embodiment of the damper device, the first shock absorber members 71 are made of resin. Thus, the first shock absorber members 71 themselves do not produce activation sounds when being compressed. Hence, the present damper device can reliably lessen activation sounds produced in device activation.

The present exemplary embodiment of the damper device further includes the second stopper mechanism 85 and the second shock absorber members 75. The second stopper mechanism 85 is configured to deactivate the high stiffness springs 61 by causing the support plate 4 and the other of the input plate 2 and the output plate 3 to contact each other. Each second shock absorber member 75 is movably disposed inside each high stiffness spring 61 and is capable of relieving the contact in the second stopper mechanism 85 during activation of each high stiffness spring 61.

In the present exemplary embodiment of the damper device, when large torque is abruptly inputted into the input plate 2, two members (i.e., the support plate 4 and the other of the input plate 2 and the output plate 3), which compress the high stiffness springs 61, can contact each other. In other words, second stopper mechanism 85 can be activated.

However, in the present damper device, each second shock absorber member 75 is disposed inside each high stiffness spring 61. Hence, the second shock absorber members 75 hinder the second stopper mechanism 85 from being activated. Further, even when the second stopper mechanism 85 is activated, the second shock absorber members 75 can lessen activation sounds of the second stopper mechanism 85. In other words, the present damper device can lessen activation sounds to be produced in device activation.

In the present exemplary embodiment of the damper device, the second shock absorber members 75 are elastic members. Further, the second shock absorber members 75 are compressible between the support plate 4 and the other of the input plate 2 and the output plate 3 when the torsion angle θ of the output plate 3 relative to the input plate 2 is less than the torsion angle θ4 at which the second stopper mechanism 85 is activated.

In the present damper device, the second shock absorber members 75 are configured to be compressed between the support plate 4 and the other of the input plate 2 and the output plate 3 when the torsion angle θ of the output plate 3 relative to the input plate 2 is less than the torsion angle θ4. Thus, the second shock absorber members 75 are configured to be compressed before activation of the second stopper mechanism 85. Hence, the present exemplary embodiment of the damper device can lessen activation sounds produced in device activation.

In the present exemplary embodiment of the damper device, the second shock absorber members 75 are elastic members made of resin.

In the present exemplary embodiment of the damper device, the second shock absorber members 75 are made of resin. Thus, the second shock absorber members 75 themselves do not produce activation sounds when being compressed. Hence, the present damper device can reliably lessen activation sounds to be produced in device activation.

Other Preferred Embodiments

The present exemplary embodiment of the invention is not limited to the aforementioned exemplary embodiment, and a variety of changes and modifications can be made without departing from the scope of the present invention.

The aforementioned exemplary embodiment has exemplified the construction that each first shock absorber member 71 is disposed inside each low stiffness spring 51, whereas each second shock absorber member 75 is disposed inside each high stiffness spring 61. Alternatively, only each first shock absorber member 71 may be disposed inside each low stiffness spring 51. Even with the construction, the advantageous effects of the present invention can be implemented.

The present invention is widely applicable to damper devices.

What is claimed is:

1. A damper device, comprising:
   a first rotary member into which a power of an engine is inputted;
   a second rotary member disposed to be rotatable with respect to the first rotary member;
   a first coil spring configured to be compressed between the first rotary member and the second rotary member;
   a second coil spring configured to be compressed between the first rotary member and the second rotary member, and having a stiffness greater than a stiffness of the first coil spring;
   an intermediate member configured to engage the first coil spring and the second coil spring and to couple the first coil spring and the second coil spring in series, the intermediate member being axially disposed between the first and second rotary members at an inner peripheral side of the first and second coil springs;
   a first stopper mechanism configured to deactivate the first coil spring by causing the intermediate member and one of the first rotary member and the second rotary member to contact each other; and
   a first contact relief member disposed movably inside the first coil spring and configured to relieve the contact in the first stopper mechanism during activation of the first coil spring.

2. The damper device according to claim 1, wherein
the first contact relief member is an elastic member, and
the first contact relief member is configured to compress between the intermediate member and the one of the first rotary member and the second rotary member when a rotary angle of the second rotary member relative to the first rotary member is less than a rotary angle at which the first stopper mechanism is activated.

3. The damper device according to claim 2, wherein
the first contact relief member is an elastic member made of resin.

4. The damper device according to claim 3, further comprising
   a second stopper mechanism configured to deactivate the second coil spring by causing the intermediate member and the other of the first rotary member and the second rotary member to contact each other; and
   a second contact relief member disposed movably inside the second coil spring and configured to relieve the contact in the second stopper mechanism during activation of the second coil spring.

5. The damper device according to claim 4, wherein
the second contact relief member is an elastic member, and
the second contact relief member is configured to compress between the intermediate member and the other of the first rotary member and the second rotary member when a rotary angle of the second rotary member relative to the first rotary member is less than a rotary angle at which the second stopper mechanism is activated.

6. The damper device according to claim 5, wherein
the second contact relief member is an elastic member made of resin.

7. The damper device according to claim 1, further comprising
   a second stopper mechanism configured to deactivate the second coil spring by causing the intermediate member and the other of the first rotary member and the second rotary member to contact each other; and
   a second contact relief member disposed movably inside the second coil spring and configured to relieve the contact in the second stopper mechanism during activation of the second coil spring.

8. The damper device according to claim 7, wherein
the second contact relief member is an elastic member, and
the second contact relief member is configured to compress between the intermediate member and the other of the first rotary member and the second rotary member when a rotary angle of the second rotary member relative to the first rotary member is less than a rotary angle at which the second stopper mechanism is activated.

9. The damper device according to claim 8, wherein
the second contact relief member is an elastic member made of resin.

* * * * *